United States Patent
Chen et al.

(12)

(10) Patent No.: US 6,246,717 B1
(45) Date of Patent: Jun. 12, 2001

(54) MEASUREMENT TEST SET AND METHOD FOR IN-SERVICE MEASUREMENTS OF PHASE NOISE

(75) Inventors: Xiaofen Chen, West Linn; Linley F. Gumm, Beaverton; Dana E. Whitlow, Aloha; Larry R. Lockwood, McMinnville, all of OR (US)

(73) Assignee: Tektronix, Inc., Beaverton, OR (US)

( * ) Notice: Subject to any disclaimer, the term of this patent is extended or adjusted under 35 U.S.C. 154(b) by 0 days.

(21) Appl. No.: 09/185,418

(22) Filed: Nov. 3, 1998

(51) Int. Cl.[7] .............................. H04Q 1/20; H04B 3/46; H04L 27/22

(52) U.S. Cl. ............................. 375/226; 375/326

(58) Field of Search ..................... 375/226, 326, 375/371, 224, 285, 346; 329/306, 307, 308

(56) References Cited

U.S. PATENT DOCUMENTS

| 4,317,206 | * | 2/1982 | Nossen | 375/224 |
| 4,953,186 | * | 8/1990 | Levy et al. | 375/371 |
| 4,985,900 | * | 1/1991 | Rhind et al. | 375/371 |
| 5,987,069 | * | 11/1999 | Furukawa et al. | 375/285 |

OTHER PUBLICATIONS

"VSB Modulation Used for Terrestrial and Cable Broadcasts" by Gary Sgrignoli, Wayne Bretl, Richard Citta, Zenith Electronics Corporation, Jun. 1995.

* cited by examiner

Primary Examiner—Tesfaldet Bocure
(74) Attorney, Agent, or Firm—William K. Bucher

(57) ABSTRACT

A system and method for in-service transmitter phase noise measurements determines phase nonlinearity by way of comparing unfiltered signal samples and regenerated reference signal samples to calculate phase nonlinearity error. Linear distortion is removed from the received signal samples in order to truly characterize nonlinear behavior of the transmitter. The unfiltered signal samples are generated without applying the receiver shaping filtering. Reference signal samples are regenerated from estimated transmitted symbols derived from the unfiltered signal samples. The transmitted symbols are estimated using a segmented slicer which dynamically estimates constellation decision levels from the unfiltered signal samples. A weighted, least-square based polynomial regression is performed on phase error samples of the unfiltered signal samples to estimate a phase nonlinear error function while suppressing the impact of other non-systematic distortions. The nonlinear phase error is removed from the phase error to produce phase noise containing carrier phase jitter and additive noise. A threshold is determined for replacing phase error values outside the threshold with random values having a distribution equivalent to the carrier phase jitter. The carrier phase jitter may be displayed as a power spectrum of the phase noise.

24 Claims, 9 Drawing Sheets

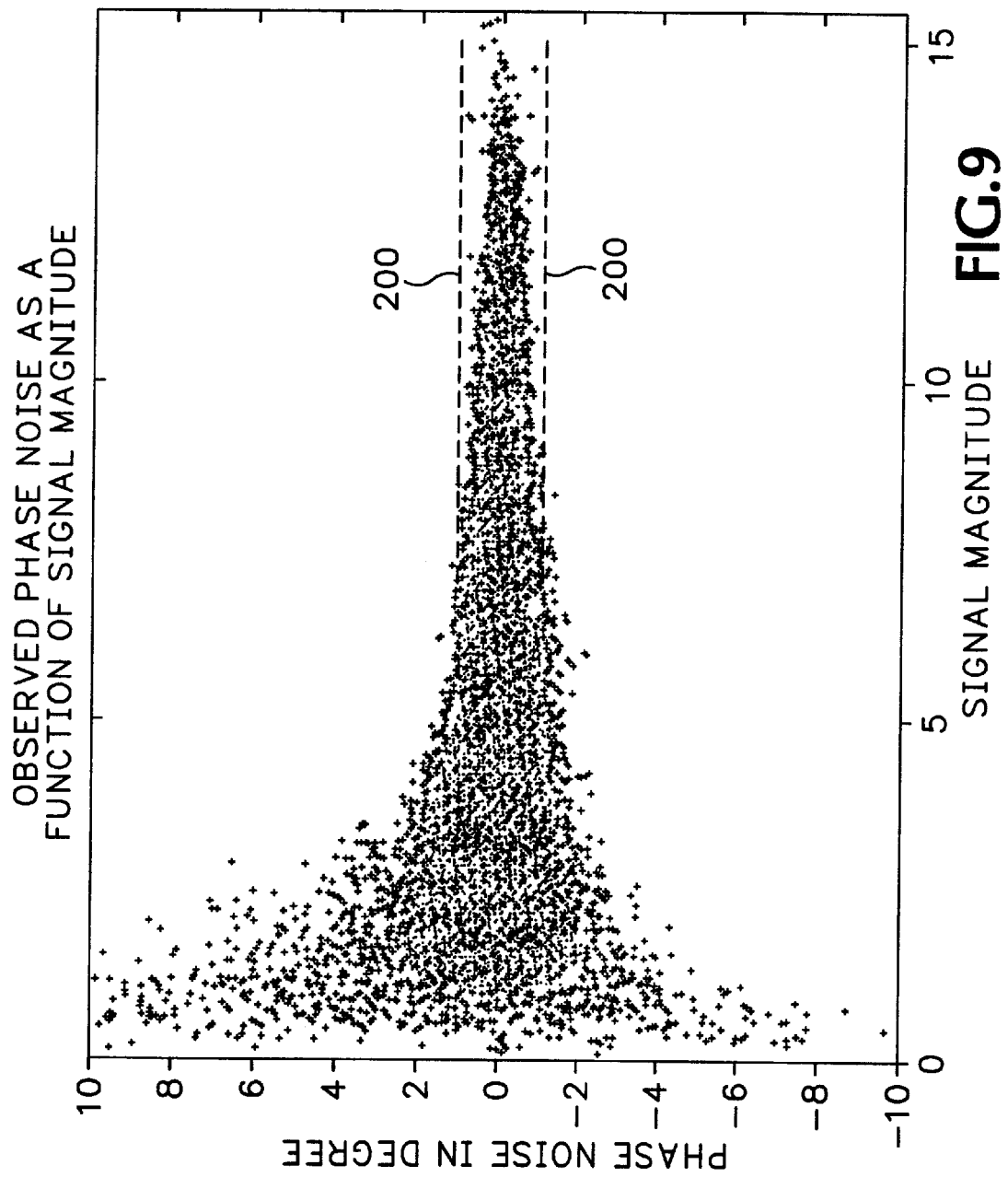

MEASUREMENT TEST SET AND METHOD FOR IN-SERVICE MEASUREMENTS OF PHASE NOISE

BACKGROUND OF THE INVENTION

The present invention relates generally to the measurement of transmission system parameters, and more particularly to a measurement test set and method for in-service measurement of carrier phase noise or carrier phase jitter.

Phase noise is a common phase distortion existing in transmitters and receivers of transmission systems. It is caused by phase jitter in the transmitter's and/or the receiver's local oscillators. The existence of phase noise can severely degrade the signal quality of a digitally transmitted RF signal. Typically the distortion present in the received signal are a mixture of linear and nonlinear magnitude errors, linear and nonlinear phase errors, additive noise, and phase noise. To monitor the quality of the transmitted signal and to trouble-shoot a degraded transmission system, accurate measurement of phase noise is very useful. However, the phase noise in the received signal is often combined with above mentioned linear and nonlinear phase errors, phase-induced additive noise errors. Due to the difficulty of separating the various phase errors, phase noise is traditionally measured in an out-of-service mode. An out-of-service mode not only requires removing the carrier's modulation, but also causes the possible loss of the phase noise characteristics caused by the presence of the digital signal as well as other distortions.

In an 8 level Vestigial Side Band (8-VSB) digital modulation system, for example, the overall system response of the combined transmitter and receiver corresponds to a raised cosine filter to avoid system generated intersymbol interference. The system response is implemented with nominally identical root raised cosine filters in the transmitter and in the receiver.

The information bearing digital data stream is randomized for spectrum spreading over the bandwidth of the frequency channel. The randomized data is forward-error-corrected (FEC) coded and interleaved. The data is trellis encoded as an 8-level (3-bit) one dimensional constellation with the outputs of the trellis coder referred to as symbols that are one of eight symmetric odd-valued integer levels from −7 to +7 units. To aid synchronization in low signal to noise and/or high multipath situations, segment and field syncs are inserted in the 10.76 Msymbols/sec symbol stream. A small pilot tone is added as well at the carrier frequency generated by offsetting the real or I channel of the complex signal containing the data and the sync pulses by 1.25 units. The offset causes the pilot tone to be in-phase with the I channel carrier frequency. At the transmitter, the composite signal passes through a root raised cosine filter and modulates an intermediate frequency carrier signal which is up-converted to an RF frequency for transmission at the desired channel frequency. Alternately, the composite signal may be used to directly modulate the RF carrier.

Synchronous demodulation may be used to detect the eight constellation decision levels. However, the constellation of the transmitted symbols may change due to the previously mentioned distortions. For example, the constellation may bend or stretch to form certain curvatures due to the nonlinear distortions in the system. Therefore, for measurement purposes, attempting to determine the transmitted symbols from the received signal in the constellation space would not be reliable using the conventional slicing method.

What is needed is a method and apparatus for accurate in-service measurement of transmitter phase noise of a received signal, where the signal has a mixture of linear distortions, nonlinear distortions, phase noise and additive noise present, that uses reliable constellation decision levels to estimate transmitted digital symbols and preserves original spectral information of the received signal.

SUMMARY OF THE INVENTION

In accordance with the illustrated preferred embodiment of the invention, an apparatus and method is disclosed which provides for in-service measurement of transmitter phase noise of a received signal that has a mixture of linear distortions, nonlinear distortions, phase noise and additive noise present, while using reliable estimation of constellation decision levels and preserving useful spectral information. Prior to the phase noise measurement, also referred to as measurement of carrier phase jitter, the received signal is time synchronized, carrier recovered and corrected for linear distortion. It includes the processes of first demodulating the received signal using the transmission system receiver filter to acquire timing and carrier information, equalizing the demodulated signal to derive the equalizer coefficients, and then using these attained parameters to perform timing synchronization, carrier recovering and equalization directly on the received signal without processing it through the transmission system receiver filter to produce unfiltered signal samples. Also prior to the nonlinear measurement, the received signal is compensated for instrument front-end linear distortion by applying a compensation filter.

The transmitted digital symbols, which are 8-VSB symbols in the preferred embodiment but may be other digital formats, are estimated for the purpose of generating reference signal samples representing the transmitted symbols. This is performed by applying the receiver filter to the unfiltered signal samples, dynamically estimating constellation decision levels from the filtered samples, and then slicing the signal samples accordingly. Reference signal samples are generated from the estimated digital symbols. Phase nonlinearities are then measured by comparing the unfiltered signal samples with the generated reference signal samples. While doing so, nonlinear distortions are distinguished from other noise-like distortions by using the systematic nature of transmitter nonlinearities and the random nature of other distortions by running a weighted, least-square based polynomial regression on the phase errors measured from the unfiltered signal samples and the reference signal samples. Phase noise caused by carrier phase jitter and additive noise is determined by removing the phase nonlinearity from the phase error. The variances of the phase noises by additive noise and by carrier jitter are estimated and the additive noise induced phase noise is suppressed by establishing a threshold based on the derived variances and replacing the phase noise outside the threshold with random values having a distribution equivalent to the carrier phase jitter or with interpolated values from adjacent within-threshold values.

The objects, advantages, and other novel features of the present invention are apparent from the following detailed description when read in conjunction with the appended claims and attached drawing.

BRIEF DESCRIPTION OF THE DRAWINGS

FIG. 9 is a phase versus magnitude plot illustrative of the scattering of the phase noise.

DETAILED DESCRIPTION OF THE PREFERRED EMBODIMENT

Figure 1:
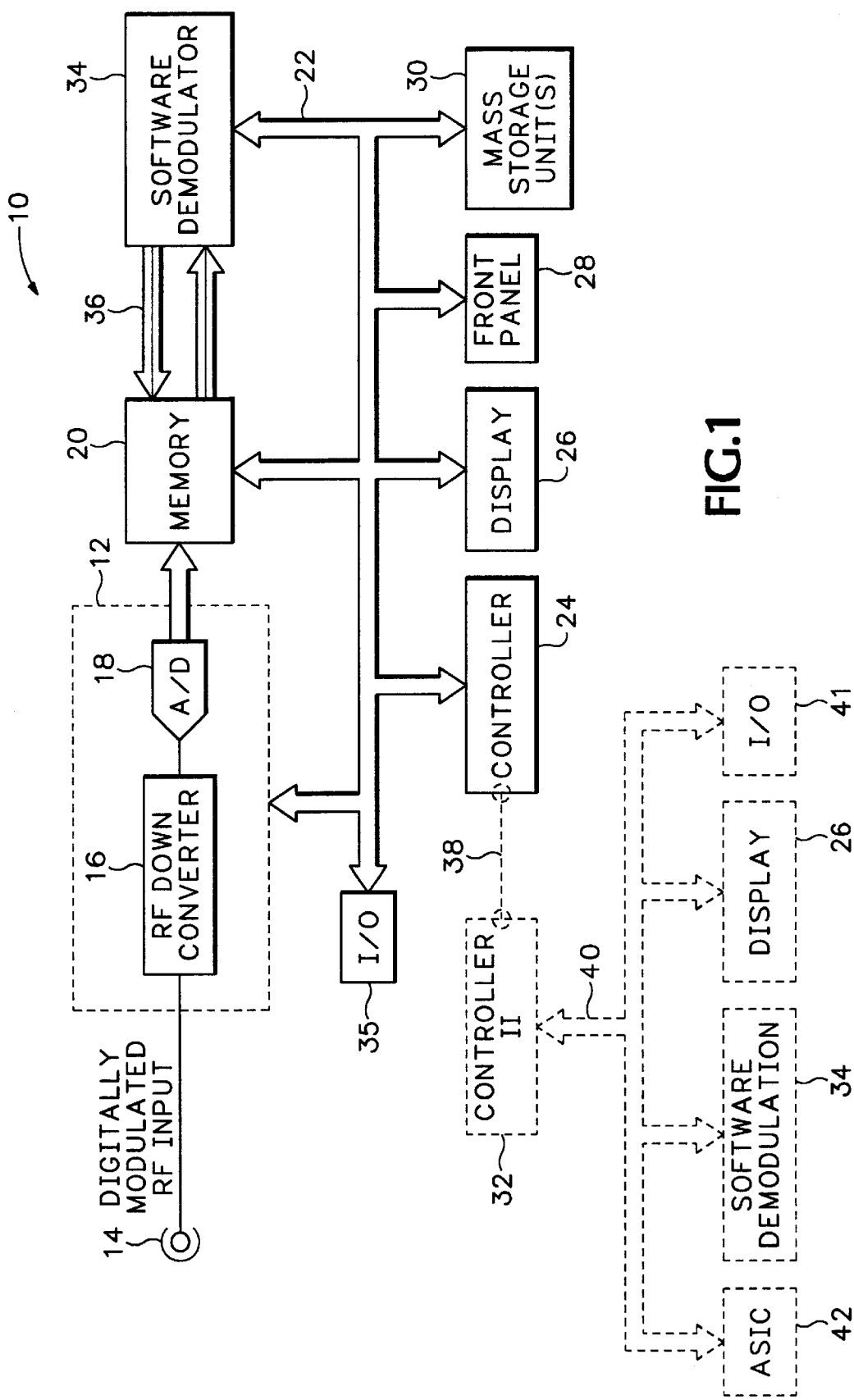
FIG. 1 is a block diagram illustrative of a transmission receiver system incorporating apparatus and method for in-service measurements of carrier phase noise according to the present invention.

In the following detailed description numerous specific details are set forth in order to provide a thorough understanding of the present invention. However, it will be understood by those skilled in the art that the present invention may be practiced without these specific details. In other instances well known methods, procedures, components, and circuits have not been described in detail so as not to obscure the present invention.

Part of the description will be presented in terms of operations performed by a computer system, using terms such as data, values, signal samples, flags, numbers and the like, consistent with the manner commonly employed by those skilled in the art to convey the substance of their work to others skilled in the art. As is well understood by those skilled in the art, these quantities take the form of electrical, magnetic, or optical signals capable of being stored, transferred, combined and otherwise manipulated through mechanical and electrical components of the computer system; and the term computer system includes general purpose as well as special purpose data processing machines, systems, and the like, that are stand alone, adjunct or embedded.

Additionally, various operations will be described as multiple discrete steps in turn in a manner that is most helpful in understanding the present invention, however, the order of description should not be construed as to imply that these operations are necessarily order dependent, in particular, the order of their presentation.

The measurement test set and method for in-service measurement of phase noise of the present invention is suitable for measuring phase noise of a broad range of digital transmission systems. Those of ordinary skill in the art will recognize that modulation of a RF carrier in a digital transmission system occurs in the analog domain with the modulation waveform on the RF carrier being based on the digital content and will be referred hereafter as a digitally modulated radio frequency signal. The preferred embodiment of the present invention will be described in relation to one of these digital transmission systems, specifically an 8-VSB digital television transmission system, and is not considered as being limited to this particular digital transmission system. For example, the proposed European standard for terrestrial digital television broadcasting, DVB-T using an OFDM format, calls for generating multiple carriers over a frequency band with each carrier containing a piece of data. The receiver performs a Fourier transform of the received signal to retrieve the data. Such a system is not required to have transmitter and receiver filters. An 8-VSB RF signal has data symbols that modulate the RF carrier at a symbol frequency at approximately 10.76 Msymbols/sec. Further, the invention is described using baseband filtered, unfiltered and reference signal samples that have been processed through linear equalization processes. The in-service measurement of phase noise of the present invention may also be implemented where a known training sequence is used for generating the reference signal samples or are provided as the reference signal samples. Also, the invention may be practiced using IF signal samples.

FIG. 1 shows a representative block diagram of a transmission system receiver 10, as could be used in a measurement instrument, digital television receiver or the like. The transmission system receiver 10 includes a hardware front end 12 receiving a digitally modulated RF input signal 14. The RF signal 14 is down converted to a digitally modulated intermediate frequency (IF) signal by RF hardware down converter circuitry 16 that generally includes one or more mixers in the IF signal path. Each mixer is driven by a local oscillator. An analog-to-digital (A/D) converter 18 receives the digitally modulated IF signal and converts the signal to digital data values that are stored in memory 20. In the preferred embodiment, the IF signal is sampled at four times the 8-VSB symbol frequency. Memory 20 includes both RAM, ROM and cache memory with the RAM memory storing volatile data, such as the data values representative of the IF signal and the like. A data and control bus 22 couples memory 20 to a controller 24, such as PENTIUM® microprocessor, manufactured and sold by Intel, Corp., Santa Clara, CA. The data and control bus 22 may also be coupled to they front end hardware 12, a display device 26, such a liquid crystal display, cathode ray tube or the like, and a front panel 28 with buttons, rotatable knobs and the like and/or control entry devices, such as a keyboard and/or mouse. A mass storage unit or units 30, such as a hard disk drive, a CD ROM drive, a tape drive, a floppy drive or the like, that reads from and/or writes to appropriate mass storage media, may also be connected to the data and control bus 22. A software demodulator 34 is representatively shown connected to the bus 22 and coupled to memory 20. The software demodulator 34 executes various processes that are performed by the controller 24 using processing routines stored in memory 20 including program instructions performing the in-service measurement of transmitter phase noise. Data flow lines 36 connect the memory 20 with the software demodulator 34 for showing the movement of data from the memory 20 to the software demodulation process and back. The program instructions may be stored and accessed from the ROM memory 20 or from the mass storage media of the mass storage unit 30. The transmission system receiver 10 in the preferred embodiment of the invention is a PC based system controlled under WINDOWS® 95 operating system, manufactured and sold by Microsoft, Corp., Redmond, Wash. Graphical plotting software, such as PROESSENTIALS™ Graphic Display Software, manufactured and sold by Gigasoft, Inc. Keller Tex., is used for generating graphical representations of phase noise measurement of the present invention. The phase noise measurement may also be exported using an I/O device 35. The apparatus for performing phase noise measurements on a digitally modulated RF signal of the present invention may also be implemented using hardware circuitry performing the same functions as described for the software implementation. Alternately, a hybrid system using multiple controllers, such as controller 32 connected to controller 24 via a serial bus 38, may be used to implement the transmission system receiver 10 and the phase noise measurement functions of the present invention. The controller 32 is coupled to a separate data and control bus 40. Controller 32 may separately control display device 26 or perform a portion or portions of the software demodulator 34 functions and/or the phase noise measurement functions. An I/O device 41 may be coupled to the control bus 40 for exporting the results of the software demodulator function or the phase noise measurement results. Further the phase noise measurement functions may be implemented using both hardware circuitry, as represented by ASIC 42 and software routines performed by the controller 24 or controllers 24 and 32.

Figure 2:
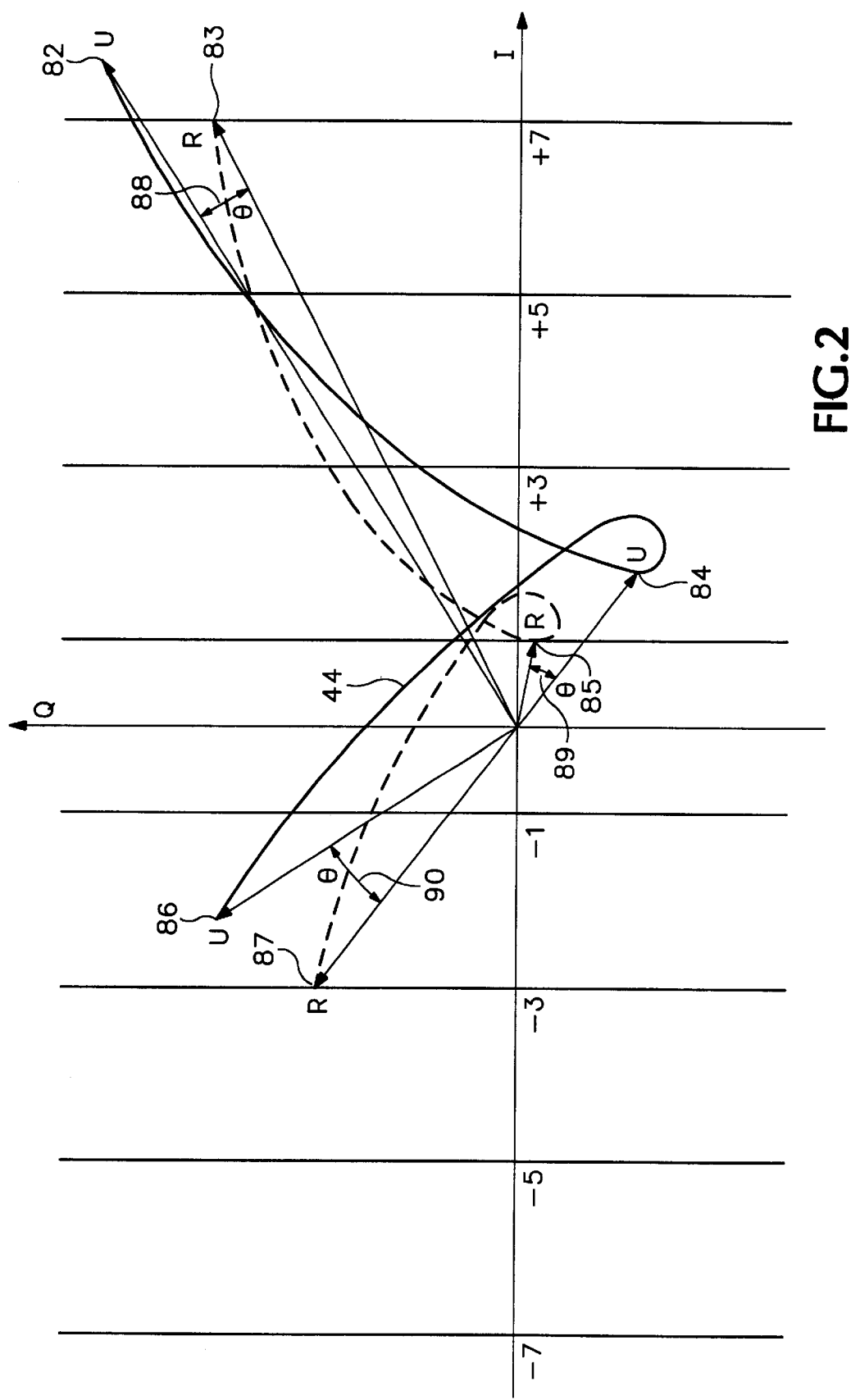
FIG. 2 is a representative constellation diagram of an 8-VSB signal showing actual and corresponding reference signal vectors plus their trajectories over time for the purpose of understanding the apparatus and method for in-service measurements of carrier phase noise according to the present invention.

Referring to FIG. 2, there is shown a polar plot of 8-VSB signal samples associated with lines representing a constellation diagram of 8-VSB signal samples. The figure will be used to describe some fundamental concepts of the 8-VSB system as well as some of the relationships affecting the phase noise measurement. The overall 8-VSB system response of the combined transmitter and receiver utilizes a raised cosine filter to create samples free of system generated inter-symbol interference at symbol times. The system response is implemented with nominally identical root raised cosine filters in the transmitter and in the receiver. The overall impulse response of the 8-VSB system is so constructed that ideally there would be no inter-symbol interference in the in-phase components which would result in 8 distinct vertical lines in the constellation diagram. Ideally, the real components are landing along the 8 vertical lines of the constellation diagram. The complex 8-VSB symbol data may be visualized on the complex plane as a vector, rotating about the origin, moving from one symbol value to another. The in-phase (real) parts of the symbol data are grouped along the real (I) axis at the appropriate symbol value. The quadrature parts of the symbol data acts to suppress the unwanted sideband and to minimize intersymbol interference and provide smooth transitions between the symbols. This is represented in FIG. 2 by line 44 for vectors representing received signal samples 82, 84, and 86 of transmitted data having nonlinear magnitude, phase errors and intersymbol interference. Corresponding reference (R) signal sample vectors 83, 85, and 87 are shown, which will be described in greater detail below. The phase angles 88, 89, and 90 between the respective received signal vectors and the reference signal sample vectors represents the phase error in the received signal samples.

Figure 3:
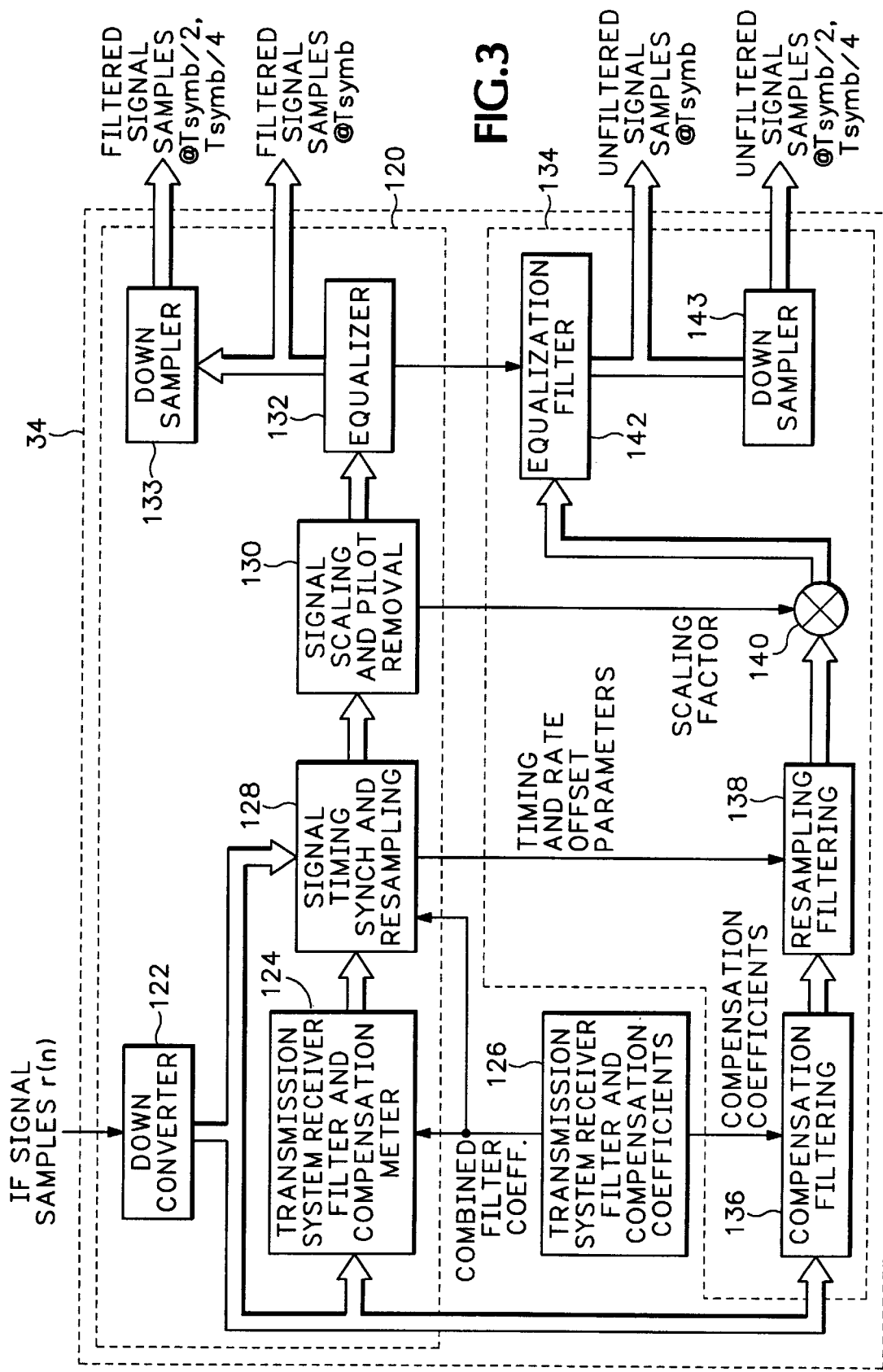
FIG. 3 is an improved demodulator used with the system for in-service measurement of carrier phase noise according to the present invention.

The signal samples, stored in memory 20, from the front end hardware 12, which in the preferred embodiment is a record of 8-VSB IF data denoted as r(n), are demodulated to baseband by the improved demodulator 34, although the methods disclosed herein could be applied to an IF signal as well. The received signal samples are also time aligned, scaled and linearly equalized by the improved demodulator 34, although equalization may not be necessary if no significant linear distortions are present. Referring to FIG. 3, the incoming IF signal is input to the improved demodulator 34 that first processes the signal samples in a first processing channel 120 to estimate the carrier phase, symbol timing frequency and phase offsets, gain factor, pilot amplitude, and equalizer coefficients. For the same IF record of data the demodulator 34 uses the carrier phase value to down convert 122 the IF signal to base band signal samples, which are stored in memory 20. The baseband signal samples in memory 20 are passed through a digital filter 124 having combined filter coefficients 126 producing a filter response of the transmission system receiver filter, which in the preferred embodiment is a root raised cosine filter, and compensation for linear distortions introduced by the hardware of the front end circuitry 12. A symbol timing synchronizer 128 estimates timing phase and rate offset parameters using the down converted signal samples and the combined filter coefficients 126 and applies the parameters to a resampling filter to time-align the filtered signal samples so every fourth sample falls at a symbol instance. A signal scaling and pilot level remover 130 receives the filtered, time-aligned signal samples and determines a scaling factor and pilot level that are used to scale the filtered, time-aligned signal samples and remove the pilot level from the signal samples. An equalizer 132 receives the filtered, time-aligned, scaled signal samples and calculates equalizer coefficients that are applied to a equalization filter within the equalizer to produce filtered, time-aligned, scaled, equalized signal samples that are free of linear errors. The filtered, time-aligned, scaled, equalized signal samples from the first processing channel 120 are output from the demodulator 34 as filtered signal samples at four samples per 8-VSB symbol time (Tsymb/4). Alternatively, the filtered, time-aligned, scaled, equalized signal samples may be passed through a down sampler 133 to produce filtered signal samples at two samples per symbol time (Tsymb/2) or samples at symbol time (Tsymb).

The second processing channel 134 of the improved demodulator 34 receives the down converted baseband signal samples from memory 20. A compensation filter 136 receives the down converted signal samples and the coefficients that compensate for the linear distortion introduced by the front end hardware circuitry 12. The output of the compensation filter are compensated signal samples. A resampling filter 138 receives the compensated signal samples and the timing phase and rate offset parameters from the symbol timing synchronizer 128 and produces compensated signal samples time-aligned to the symbol frequency. A scaler 140 receives the compensated, time-aligned signal samples and the scaling factor from the pilot level estimator 130 and produces compensated, time-aligned, scaled signal samples. An equalization filter 142 receives the compensated, time-aligned, scaled signal samples and the equalizer coefficients from the equalizer 132 and produces compensated, time-aligned, scaled, equalized signal samples that are linear-error corrected. Note, the signal samples from the second processing channel 134 are demodulated and equalized without the transmission system's receiver filter 124. The receiver filter 124 changes the spectrum of an in-band signal, which is undesirable in accurate phase noise measurements. The compensated, time-aligned, scaled, equalized signal samples from the second processing channel 134 are output from the demodulator 34 as unfiltered signal samples at four samples per symbol time (Tsymb/4) with in-phase (I) and quadrature (Q) components denoted as $\{r_i(n), r_q(n)\}$. Alternatively, the compensated time-aligned, scaled, equalized signal samples may be passed through a down sampler 143 to produce unfiltered signal samples at two samples per symbol time (Tsymb/2) or samples at symbol time (Tsymb). The above described improved demodulator 34 is described in greater detail in co-pending patent application Ser. No. 09/185,418 filed Nov. 3, 1998.

Figure 4:
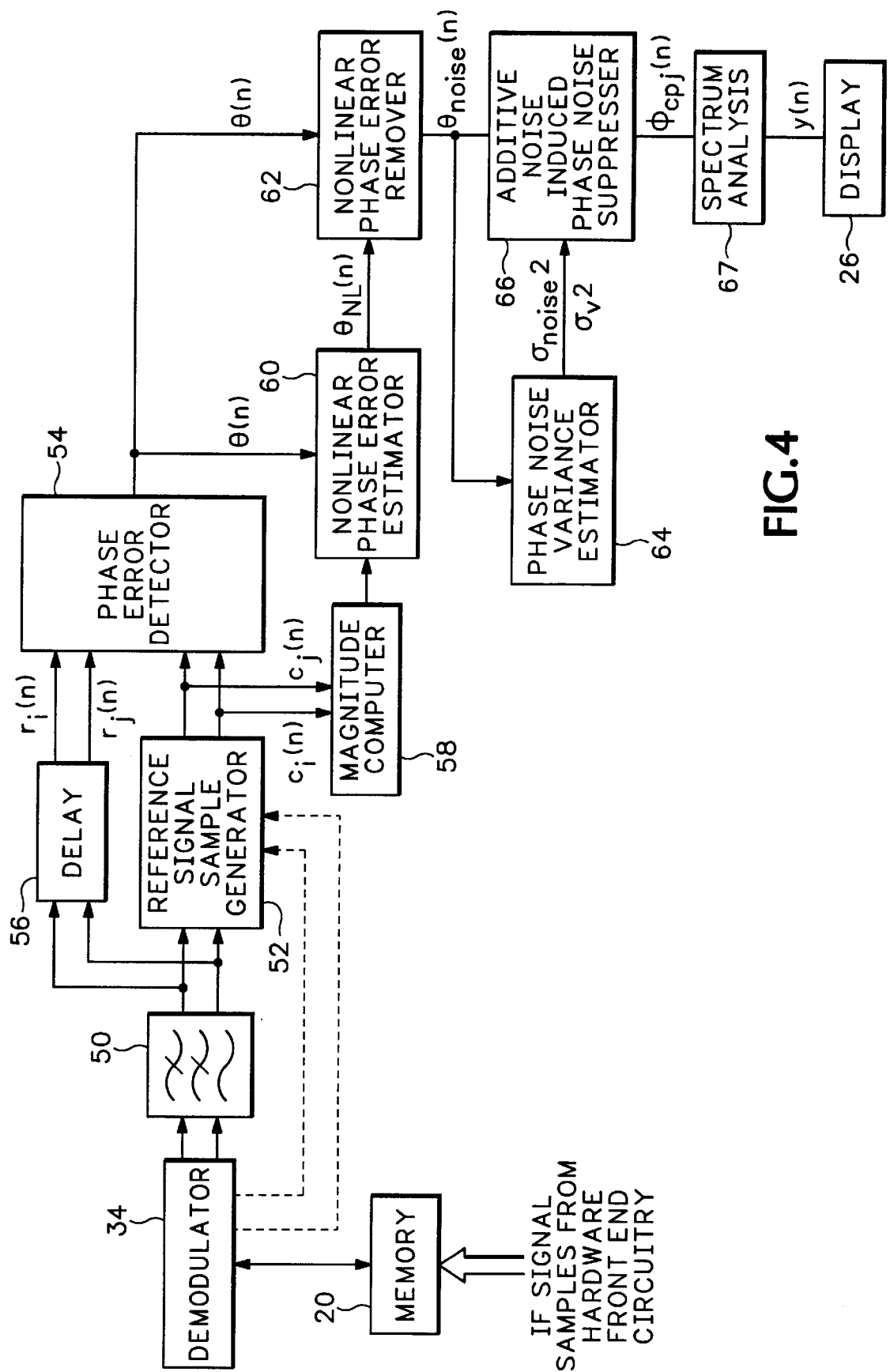
FIG. 4 is a block diagram of a system for in-service measurement of carrier phase noise according to the present invention.

Referring to FIG. 4, there is shown a representative block diagram of a system incorporating the present invention for in-service measurement of phase noise. The IF signal samples, stored in memory 20, from the front end hardware 12 down conversion are coupled to an improved demodulator 34 where the signal samples are down converted to baseband signal samples. The demodulator 34 produces the filtered and unfiltered signal samples that are stored in memory 20. The filtered signal samples have been processed to include filtering through a transmission system receiver filter and the unfiltered signal samples have been processed without passing the samples through the transmission system receiver filter. The unfiltered signal samples, stored in memory 20, are input to a reference signal sample generator 52 via a low pass filter 50. The low pass filter 50, which has a flat amplitude and linear phase response across the signal band, assures the removal of the sum terms in the spectrum that are produced when down converting the IF signal samples to baseband. The unfiltered signal samples are also input to a phase error detector 54 via a delay 56. The delay 56 provides time alignment of the unfiltered signal samples with reference signal samples produced by the reference signal sample generator 52. In an alternative implementation, the filtered signal samples from memory 20 are input to the reference signal sample generator 52 with the unfiltered signal samples being filtered by the low pass filter 50 and the coupled to the phase error detector 54 via the delay 56. The reference signal sample generator 52 produces reference signal samples representing the estimated symbol values that were transmitted at the transmitter of the transmission system with the estimated symbol values in the same state as the signal samples at the output of lowpass filter 50. The reference signal samples are coupled to a magnitude computer 58 and to the phase error detector 54. The magnitude computer 58 produces magnitude values M(n) of the reference signal samples. The reference magnitude values M(n) are coupled to a nonlinear phase error estimator 60. The phase error detector 54 is coupled to the nonlinear phase error estimator 60 and to a nonlinear phase error remover 62. The output of the nonlinear phase error estimator 60 is coupled to the nonlinear phase error remover 62. The output of the nonlinear phase error remover 62 is coupled to a phase noise variance estimator 64 and an additive noise induced phase noise suppressor 66. The phase variance estimator 64 estimates the variance of the phase noise by the carrier jitter and the variance of the phase noise induced by additive noise. The estimated variances are coupled to the additive phase noise suppressor 64 to establish thresholds for suppressing the phase noise induced by the additive noise. A spectrum analyzer 67 function receives the resultant carrier phase noise from the additive phase noise suppressor 66 and generates power spectrum values of the phase noise, which is coupled to the display 26.

Figure 5:
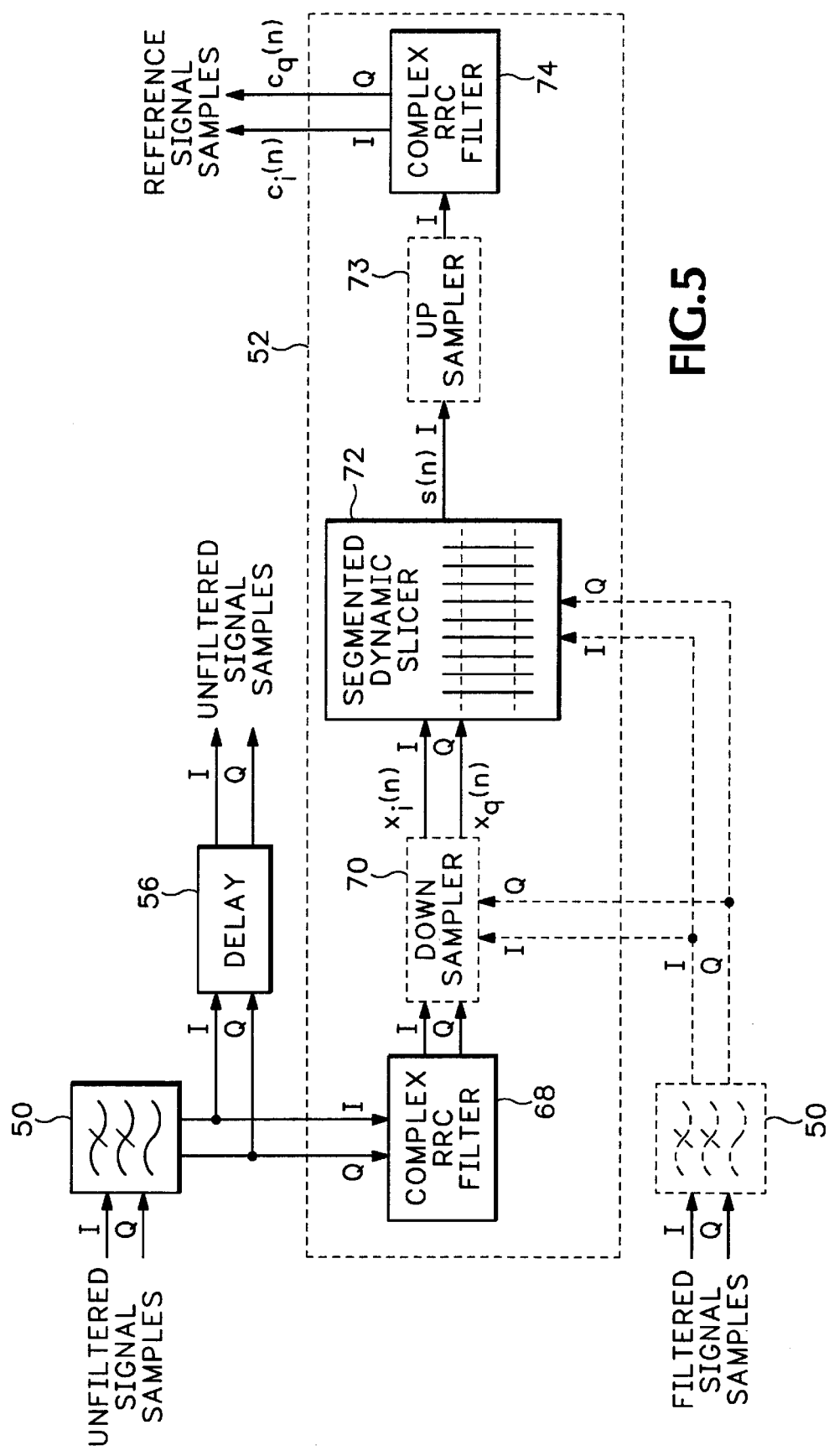
FIG. 5 is a block diagram of the reference signal sample generator in the system for in-service measurement of carrier phase noise according to the present invention.
Figure 6:
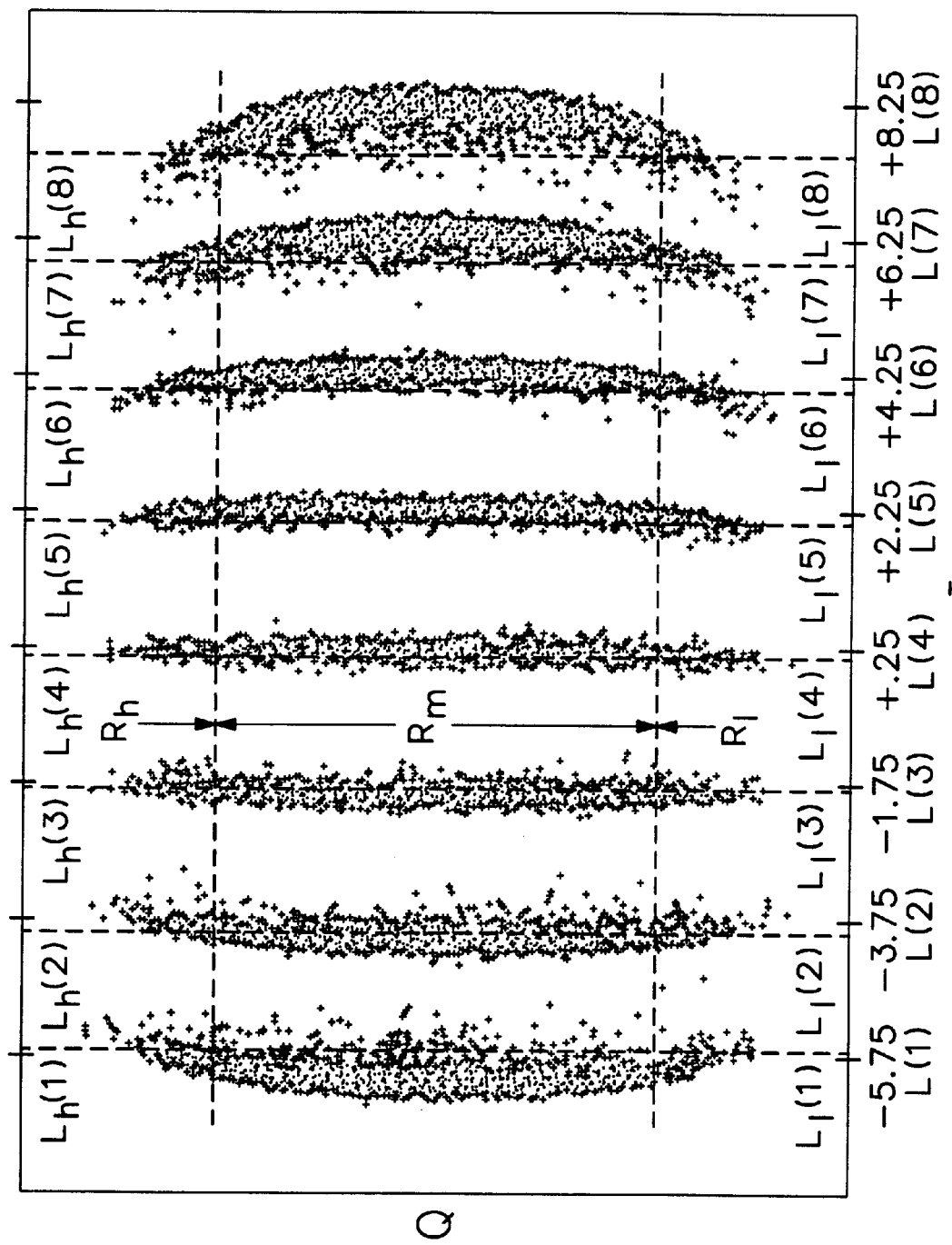
FIG. 6 is a graphical representation illustrating constellation distortion in the system for in-service measurement of carrier phase noise according to the present invention.
Figure 7:
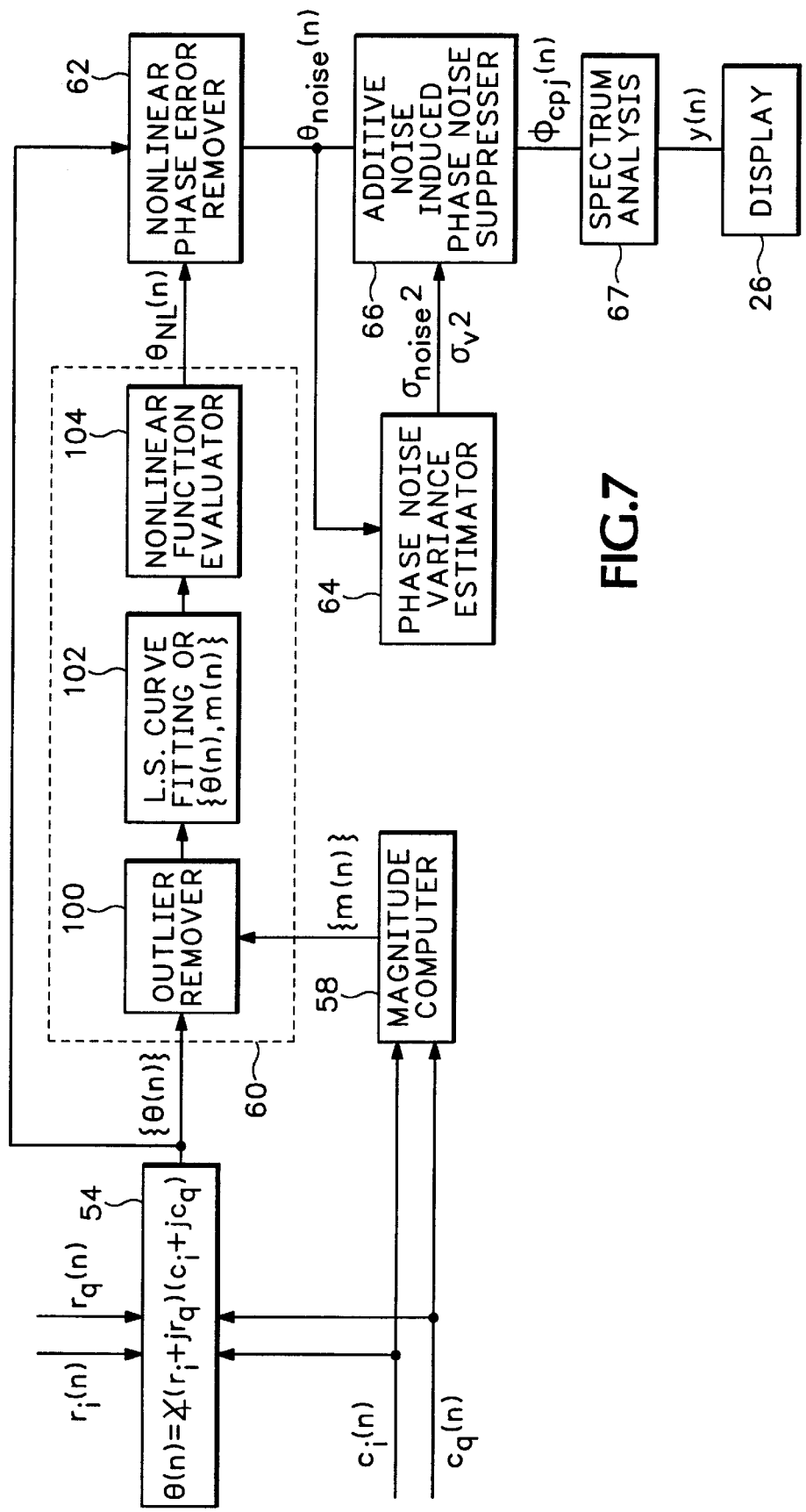
FIG. 7 is a more detailed block diagram of a system for measuring carrier phase noise from unfiltered and reference signal samples according to the present invention.

The reference signal sample generator 52 is illustrated in greater detail in FIG. 5. In the preferred embodiment, the unfiltered signal samples from the demodulator 34 are coupled to the reference signal sample generator 52 via the low pass filter 50. The unfiltered signal samples are first filtered by the transmission system's receiver filter 68 (a complex root raised cosine (RRC) filter in the preferred embodiment) and down sampled to symbol times by down sampler 70 before a multi-region dynamic slicer 72 determines the transmitted symbols. The multi-region dynamic slicer 72 produces signal samples representing symbols denoted as $\{x_i(n), x_q(n)\}$ from the unfiltered signal samples that have passed through the RRC filter 68. The multi-region dynamic slicer 72 uses symbols $\{x_i(n), x_q(n)\}$ and slices on $x_i(n)$ to make decisions that estimate the transmitted symbols prior to modulating the transmitter carrier. Since large nonlinear distortion may cause constellation curvature, to perform an accurate symbol estimate, the constellation space having I and Q-dimensions is divided by the multi-region slicer 72 into several regions along the quadrature-dimension (Q-dimension) as shown in FIG. 6. Note that in the preferred embodiment where the unfiltered signal samples are applied to the multi-region slicer 72, the I-phase levels in the multi-region slicer 72 contain the 1.25 pilot level. In the embodiment where the filtered signal samples without the pilot level are applied to the slicer 72, the pilot level needs to be added back-in to generate reference signal samples corresponding to the unfiltered signal samples.

For each Q-dimension region $\{R_h, R_m, R_1\}$, I-dimension reference levels are dynamically estimated from the in-phase I-dimension samples. In the preferred embodiment, the constellation space is divided along the Q-dimension into 3 regions, $\{R_h, R_m, R_1\}$ as shown in the figure.

$$\{R_h | x_q(n) > [L(8)-L(1)]/2\} \tag{1}$$

$$\{R_m | -[L(8)-L(1)]/2 \leq x_q(n) \leq [L(8)-L(1)]/2\} \tag{2}$$

$$\{R_l | x_q(n) > -[L(8)-L(1)]/2\} \tag{3}$$

where $L(1), L(2), \ldots, L(8)$ are the ideal constellation levels along the I-dimension without the pilot level (Note: Equations 1, 2 & 3 assume the Q-channel gain is equal to the I-channel gain). From samples $\{x_i(n), x_q(n)\}$, the I-dimension constellation level sets $L_h(k)$, $L_m(k)$ and $L_1(k)$ ($k=1, 2, \ldots, 8$) are estimated. In the preferred embodiment of the invention, a Lloyd_Max quantizer is used for clustering the I-dimension values within each region to estimate I-dimension reference levels for each of the regions. The quantizer minimizes the mean square error for a given number of quantization levels or clusters M. For each region, the mean square clustering error is defined as follows:

$$\epsilon = E[(x - x^*)^2] \tag{4}$$

$$= \sum_{k=1}^{M} \int_{t(k)}^{t(k)+1} (x - L_x(k))^2 P_x(x) dx$$

where x is the I-dimension data with probability density function $p_x(x)$, $L_x(\cdot)$'s are the cluster values to be estimated, and t(k) is the decision boundary between region k−1 and k. Setting the derivatives of $\epsilon$ with respect to t(k) and $L_x(k)$ to zero will give the optimal t(k) and $L_x(k)$.

$$\frac{\partial \epsilon}{\partial t(k)} = 0 \tag{5}$$

$$\frac{\partial \epsilon}{\partial L_x(k)} = 0$$

$$t(k) = \frac{(L_x(k) + L_x(k-1))}{2} \tag{6}$$

$$L_x(k) = \frac{\int_{t(k)}^{t(k+1)} x p_x(x) dx}{\int_{t(k)}^{t(k+1)} p_x(x) dx} \tag{7}$$

Equation (7) show that the optimal quantization level $L_x(k)$ in the decision region [t(k), t(k+1)] is its conditional mean in that region.

In implementation, the optimal $L_x(k)$'s are searched using the following iterative clustering process:

quantize $x_i(n)$ to A level (A>>M):

$$x(n) = \text{round}\left(\frac{x_i(n) - x_{min}}{x_{max} - x_{min}}(A-1) + 1\right) \quad (8)$$

$$x_{min} = \max_n [x_i(n)]$$

$$x_{max} = \min_n [x_i(n)]$$

approximate the probability density function of $x(n)$ by a normalized histogram, denoted as $p_x(k)$ (k=1, ..., A)

initialize decision boundary levels $t(k+1)$ (k=1, ..., M) evenly across A data levels $$L(k+1) = \text{round}\left(\frac{kA}{M}\right) + 1 \quad (9)$$

$$t(1) = 1$$

calculate M clustering levels $L_x(k)$ according to equations (10) and (11) below $$L_x(k) = \frac{\sum_{i=t(k)}^{t(k+1)-1} i p_x(i)}{\sum_{i=t(k)}^{t(k+1)-1} p_x(i)} \quad (10)$$

$$t(k) = \frac{L_x(k) + L_x(k-1)}{2} \quad k > 1 \quad (11)$$

$$t(1) = 1; \quad t(M+1) = A + 1$$

$$\text{quantization error: } \epsilon(k) = \frac{\sum_{i=t(k)}^{t(k+1)-1} (i - L_x(k))^2 p_x(i)}{\sum_{i=t(k)}^{t(k+1)-1} p_x(i)} \quad (12)$$

If a particular region has no elements, i.e. $p_x(i)=0$ for $i=L(k)$ to $L(k+1)-1$, then merge this region to its adjacent region. At the end of one iteration (i.e., after k=1 to M), search for a region m which has the maximum quantization error $\epsilon(m)$ and insert an additional decision boundary level at $L_x(m)$.

iterate previous two procedures for T times (e.g., T=5)

Restore the cluster levels $L_x(k)$'s to the original scale of data and calculate final quantization level $L_x(k)$ (k=1, 2, ..., M) as follows $$L_x(k) = E[x|(x - L_x(k))^2 < (x - L_x(j))^2, \forall j \neq k, 1 \leq j \leq M] \quad (13)$$

While the above described Lloyd_Max quantizer is implemented in the preferred embodiment of the invention, it is used as an example only. Other clustering methods and search schemes could be used without deviating from the concept of the segmented dynamic slicing.

The transmitted symbols denoted as $s(n)$ are estimated using a 3-region scheme in the following manner. For example, if $x_q(n) \in R_h$, $L_h(\cdot)$ is used as the quantizing level set then the closest I-dimension cluster level $L_h(m)$ to $x_i(n)$ is found. The transmitted symbol is then determined as $s(n)=L(m)$. The same procedure applies for $x_q(n) \in R_m$ and $x_q(n) \in R_l$. The constellation space divided by the multi-region dynamic slicer 72 is used by example only and other constellation space dividing schemes may be used without departing from the scope of the invention as set forth in the appended claims.

A reference version of the transmitted signal denoted as $\{c_i(n), c_q(n)\}$ is then regenerated from the estimated transmitted symbols $s(n)$. The reference signal samples are regenerated for comparison by up-sampling the estimated transmitted symbols $s(n)$ to the unfiltered signal sample rate in up-sampler 73 and filtered using a transmission system transmitter filter 74 (an 8-VSB complex RRC filter in the preferred embodiment). The reference signal samples are input to the phase error detector 54 and the magnitude computer 58.

Referring again to FIG. 4, the magnitude computer 56 generates magnitude values $M(n)$ from the reference signal samples received from the reference signal sample generator 52. Note that the unfiltered signal samples $\{r_i(n)\}$, $\{r_q(n)\}$ and the reference signal samples $\{c_i(n)\}$, $\{c_q(n)\}$ are synchronized with each other in the preferred embodiment by means of a delay 56.

Phase error is measured in the phase error estimator 54 by comparing the phases between the unfiltered signal samples and the reference signal samples. The phase error is defined as:

$$\theta(n) = \sphericalangle \{[r_i(n) + jr_q(n)][c_i(n) - jc_q(n)]\} \quad (14)$$

The phase error $\theta(n)$ may contain nonlinear phase error requiring an estimation of a nonlinear error function and the removal of the nonlinear phase error $\theta_{NL}(n)$ from $\theta(n)$ as described below. Phase error in the small magnitude region is often biased and has large variations due to an imperfect down conversion, reference generation error and additive noise in the system. To overcome this problem, the following is performed by applying the phase error values $\theta(n)$ derived from the reference and unfiltered signal samples in the phase error estimator 54 and the reference magnitude values $M(n)$ from the magnitude computer 58 to the nonlinear phase error estimator 60 containing an outlier remover 100, a least-squares polynomial curve fitter 102 and a nonlinear phase error evaluator 104.

The outlier remover 100 establishes boundaries or thresholds in phase error versus magnitude space for removing largely deviated phase error values that affect the accuracy of estimating a phase nonlinear function. The signal magnitude range, derived from the reference signal samples, is divided into several subranges $R_M(k)$ (k=0, 1, ... K) in the outlier remover 100.

$$M_1 = \min_n \{M(n)\} \quad (15)$$

$$M_2 = \max_n \{M(n)\} \quad (16)$$

$$R_M(k) = M_1 + kM_2 - \frac{M_1}{K} \quad (17)$$

In each subrange, $R_M(k) \leq M(n) < R_M(k+1)$, those phase error values having large deviations are dropped from the nonlinear function estimation. For small magnitude regions, (e.g. $k \leq K/3$), the decision boundary is determined based on a probability histogram and a prior $p(k)$. As shown below, the boundary is determined so that within the boundary the data probability would be equal to $p(k)$ and the probability density should be the largest in the subrange.

$$P(\theta_{low}(k) \leq \theta \leq \theta_{up}(k)) = p(k) \quad (18)$$

$$\{\theta_{low}(k), \theta_{up}(k)\} = \arg\max\left\{\frac{p(k)}{\theta_{up}(k) - \theta_{low}(k)}\right\}, \forall \theta \in R_M(k) \quad (19)$$

The upper and lower boundaries are linearly interpolated between regions to have a smooth boundary contour.

While the above described histogram-based method is applicable for large magnitude regions, it proves to be computationally inefficient. The decision boundaries or thresholds for detecting outliers in the large magnitude regions may be implemented in the following manner for large magnitude regions. The decision boundaries are based on the mean and variance of the phase error in the respective large magnitude subranges.

mean of the error values in subrange k:

$$m_k = \theta[\theta(n) \| R_M(k) \leq M(n) < R_M(k+1)] \quad (20)$$

variance of the error values in subrange k:

$$\sigma_k^2 = \theta[(\theta(n) - m_k)^2 \| R_M(k) \leq M(n) < R_M(k+1)] \quad (21)$$

k=0, 1, ... K−1

Threshold $TH_k = \alpha \sigma_k$ e.g., $\alpha = 1$ \quad (22)

vector $\{\theta(i), M(i)\} = \{\theta(n), M(n) \| \text{for } |\theta(n) - m_k| \leq TH_k\}$ \quad (23)

Phase nonlinearities are defined as a function of instantaneous signal magnitude. Therefore, to estimate a phase nonlinear function, the error set $\{\theta(n')\}$ is ordered as a function of signal magnitude $M(n')$ in the nonlinear phase error relationship estimator 102 and a least square based (LS) polynomial curve fitting, although other regression methods may be used, is performed on the vector array $\{\theta(n), M(n)\}$. A polynomial curve fitting has the following form:

$$y = a_0 + a_1 x + a_2 x^2 + \ldots + a_D x^D \quad (24)$$

where D is the polynomial order. A least square magnitude nonlinearity curve is then derived based on the following equations. Due to the fact that large nonlinear error often occur when the signal has a large magnitude, and the 8-VSB signal has a small probability of large magnitudes, a weighting function is applied to the LS curve fitting procedure to emphasize the large magnitude data pair. For example, for magnitude data greater than 0.75 ($L_{(8)} - L_{(1)}$), multiply both sides of the curve fitting function by a factor of 3. Also, to improve estimation accuracy, the reference magnitude values entering the least square curve fitting are shifted by a constant value to centerize the magnitude values (e.g., $M(n) = M(n) - \text{mean}(M(n))$.

$$\theta = MA \quad (25)$$

$$\theta = [\theta(1), \theta(2), \ldots, \theta(N)]^T \quad (26)$$

$$A = [a_0, a_1, a_2, \ldots, a_D]^T \quad (27)$$

$$M = \begin{bmatrix} 1 & M(1) & \cdots & M(1)^D \\ 1 & M(2) & \cdots & M(2)^D \\ \vdots & \vdots & \cdots & \vdots \\ 1 & M(N) & \cdots & M(N)^D \end{bmatrix} \quad (28)$$

$$A = (M^T M)^{-1} M^T \theta \quad (29)$$

From the estimated polynomial coefficients A, a smoothed polynomial function 104 is derived over the range of signal magnitude.

$$\theta(M) = a_0 + a_1 M + \ldots + a_1 M^D \, m \in \text{signal magnitude range} \quad (30)$$

For nonlinear phase errors $\theta_{NL}(n)$, its nonlinear function is given by equation 30.

Phase noise may be defined as the residual phase when the phase errors caused by linear and nonlinear phase distortions are removed from $\theta(n)$. For each data set $\{r_i(n), r_q(n)\}$ and $\{c_i(n), c_q(n)\}$, calculate its ideal magnitude $M(n)$ from $\{c_i(n), c_q(n)\}$, use the nonlinear phase function to calculate the phase error $\theta_{NL}(n)$ contributed by phase nonlinearity, and subtract $\theta_{NL}(n)$ from $\theta(n)$ to get phase noise $\theta_{noise}(n)$.

$$M(n) = \sqrt{c_{i(n)}^2 + c_{q(n)}^2} \quad (31)$$

$$\theta_{NL}(n) = b_0 + b_1 M(n) + b_2 M^2(n) + \ldots + b_M M^M(n) \quad (32)$$

$$\theta_{noise}(n) = \theta(n) - \theta_{NL}(n) \quad (33)$$

The measured phase noise $\theta_{noise}(n)$ still contains the unwanted part $\theta_{an}(n)$ caused by the additive noise.

$$\theta_{noise}(n) = \theta_{cpj}(n) + \theta_{an}(n) \quad (34)$$

Figure 8:
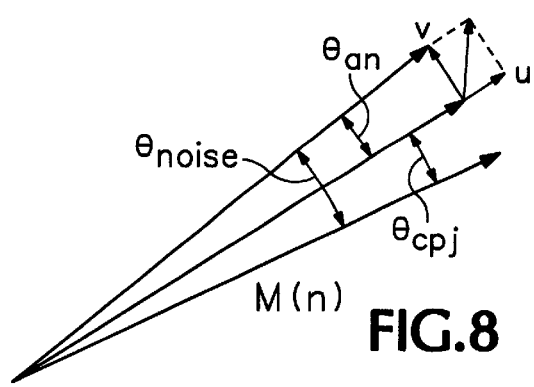
FIG. 8 is a signal vector diagram illustrative of the phase noise components in a transmitted digitally modulated signal.

$\theta_{cpj}(n)$: phase noise due to carrier phase jitter $\theta_{an}(n)$: phase noise induced by additive noise Referring to FIG. 8, there is illustrated a vector diagram representation of signal vector $\{c_i(n), c_q(n)\}$ with magnitude $M(n)$ showing phase noise $\theta_{noise}(n)$ being composed of additive noise-induced phase noise $\theta_{an}(n)$ and carrier phase or jitter $\theta_{cpj}(n)$. The additive noise can be decomposed into two components: one orthogonal to the signal vector, labeled as $v(n)$, and one parallel to the signal vector, labeled as $u(n)$. Additive noise-induced phase noise $\theta_{an}(n)$ is a function of signal magnitude $M(n)$ and the additive noise component $v(n)$, as expressed by the following equations.

$$\theta_{an}(n) \cong \tan^{-1}\left(\frac{v(n)}{M(n)}\right) \quad (35)$$

$$\cong \frac{v(n)}{M(n)} \text{ for small phase}$$

Consequently, the measured phase noise $\theta_{noise}(n)$ is a function of signal magnitude as shown by the below equations.

$$\theta_{noise}(n) = \theta_{cpj}(n) + \theta_{an}(n) \quad (36)$$

$$= \theta_{cpj}(n) + \frac{v(n)}{M(n)} \quad (37)$$

Referring to FIG. 9, there is illustrated the phase noise $\theta_{noise}(n)$ reordered as a function of the signal magnitude $M(n)$ showing a scattered phase-versus-magnitude plot. Due to the energy dispersive nature of wideband digital signals (i.e., the digital signal is a pseudo-random sequence) and the low-frequency nature of the carrier phase jitter, the statistics of $\theta_{cpj}(M)$, especially the first and second order moments, are invariant versus signal magnitude, whereas the statistics of $\theta_{an}(M)$ vary with signal magnitude. Assume $\theta_{cpj}$ and $\theta_{an}$ (or v) are independent of each other, and the additive noise v has the same variance for all signal magnitudes, an expression of the measured phase noise as a function of signal magnitude, additive noise and the phase jitter is derived as shown by the below equation.

$$\theta_{noise}(M) = \theta_{cpj}(M) + \frac{v(M)}{M} \qquad (38)$$

The phase noise variance is:

$$\sigma_{noise}^2(M) = \sigma_{cpj}^2 + \frac{\sigma_v^2}{M^2} \qquad (39)$$

$\sigma_{noise}^2(M)$ variance of $\theta_{noise}$ at signal magnitude $M$ $\sigma_{cpj}^2$ variance of $\theta_{cpj}$ $\sigma_v^2$ variance of additive noise $v$ A least-squares (LS) estimation of the variances $\sigma_{cpj}^2$ and $\sigma_v^2$ is derived from the following equations in the phase noise variance estimator 62.

Matrix Expression of the phase noise variance function (39)

$Y = \Lambda X$ (40)

LS solution: $X = (\Lambda^T \Lambda)^{-1} \Lambda^T Y$ (41)

where $Y = [\sigma_{noise}^2(M_1) \sigma_{noise}^2(M_2) \ldots \sigma_{noise}^2(M_k)]^T$ (42)

$X = [\sigma_{cpj}^2 \sigma_v^2]^T$ (43)

$$\Lambda = \begin{bmatrix} 1 & 1/M_1^2 \\ 1 & 1/M_2^2 \\ \vdots & \vdots \\ 1 & 1/M_k^2 \end{bmatrix} \qquad (44)$$

$M_1 \le M_2 \le \cdots \le M_k$

For estimation accuracy, $M_1$ has to be above a certain level. The overall phase noise power spectrum may be calculated as:

$$P_{\theta_{noise}}(\omega) = P_{\theta_{cpj}}(\omega) + P_v(\omega) \otimes P_{1/M}(\omega) \qquad (45)$$

$$= P_{\theta_{cpj}}(\omega) + \sigma_v^2 P_{vo}(\omega) \otimes P_{1/M} \qquad (46)$$

re ⊗ stands for convolution, $P_{1/M}(\omega)$ is the power spectrum of $1/M(n)$, and $P_{vo}(\omega)$ is the normalized power spectrum (shape) of $v(n)$ and is assumed known. If the additional noise is white noise, the result is a simplified measure of the additive noise contribution to phase noise as shown by the below equation.

$$\sigma^2 = \sigma_v^2 \sum_{n=1}^{N} \frac{\frac{1}{M^2(n)}}{N} \qquad (47)$$

Knowing the contribution of additive noise, its impact can be suppressed on the phase noise measurement. As seen from FIG. 9, the points outside threshold lines 200 are mainly due to the additive noise. The threshold is selected based on the assumption of carrier phase noise distribution and the variances of carrier phase noise and additive noise-induced phase noise.

Threshold $T = a\sigma_{cpj} + b\sigma_v$ weighting factor $a \ge 1$, $0 \le b \le 1$ (48)

For example, if the phase jitter is uniformly distributed, a factor of sqrt (3) should be comprised in the factor a. Considering an error margin in the estimation, values of a=1.25×sqrt (3) and b=0.25 could be used for the threshold, which would yield a confidence level greater than 99% for a normal distributed carrier phase noise.

Points outside the threshold lines 200 are substituted with random data having the same distribution as the carrier phase noise in [0,T] (e.g. a uniform distribution) and having the same phase polarity as the measured phase value $\theta_{noise}$ in the additive noise suppressor 64.

$$\phi_{noise}(n) = \qquad (49)$$

$$\begin{cases} \theta_{noise}(n) & |\theta_{noise}(n) - \overline{\theta}_{noise}(M(n))| \le T \\ \text{sign }(\theta_{noise}(n)) U_{[0,T]} + \overline{\theta}_{noise}(M(n)) & \text{otherwise} \end{cases}$$

where $U_{[0,T]}$ is a random function having the same distribution as the carrier phase noise in [0,T] and $0 \le U_{[0,T]} \le T$. $\overline{\theta}_{noise}$ (M) is the mean of the $\theta_{noise}$ at signal magnitude M. Phase $\phi_{noise}$ (n) is the final phase noise measure with the impact from additive noise being largely suppressed and with the systematic phase errors being removed. Other suppression methods may be used instead of equation 49. For example, replace the points outside the threshold with interpolated points within the threshold using time-domain adjacent within-threshold points.

Carrier spectrum may be viewed directly from the power spectrum of the phase noise. The spectrum analyzer 66 produces a single sideband power spectrum of the phase noise. In the following analysis, a carrier or pilot signal with phase noise may be expressed as:

$$y(n) = A \sin(\omega_c n + \phi_{noise}(n)) \qquad (50)$$

$$= A \sin(\omega_c n)[J_0(\theta) + 2J_2(\theta)\cos 2pn + 2J_4(\theta)\cos 4pn + \cdots] + \qquad (51)$$
$$A \cos(\omega_c n)[2J_1(\theta)\sin pn + 2J_3(\theta)\sin 3pn + \cdots]$$

where $\phi_{noise}(n) = \theta \sin pn$ p a random variable $J_i(\theta)$: Bessel Function of $\theta$, for small $\theta$, $J_0(\theta) = 1$ $J_1(\theta) \approx \theta/2$, $J_2(\theta) \approx J_3(\theta) \approx \ldots 0$, Thus, for small phase noise:

$$y(n) \approx A \sin(\omega_c n) + A\phi_{noise}(n)\cos(\omega hd cn) \qquad (52)$$

Figure 10:
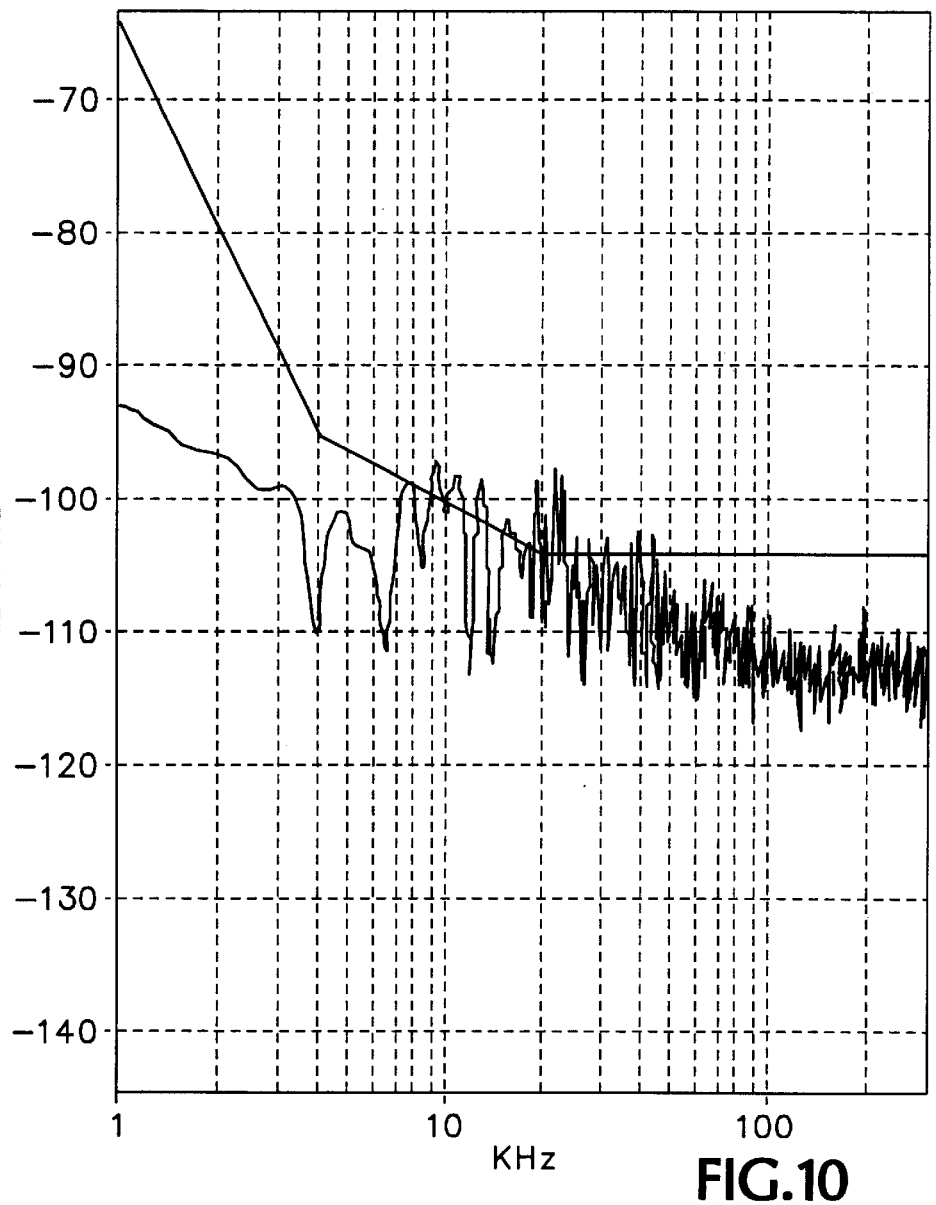
FIG. 10 is a graphic representation of the power spectrum of carrier phase noise.

The shape of the power spectrum of the carrier or pilot is fully represented by the power spectrum of the phase noise without losing any generality. Therefore, in the measurement, a single sideband power spectrum of the phase noise is measured at $\omega_c = 0$ for a frequency range of interest. A representation of a graphic display of measurement results is shown in FIG. 10. The power spectrum of the phase noise is plotted versus frequency.

The above described system for in-service phase noise measurement in a transmission system has been described as a series of instruction executed by a processor of a measurement receiver on signal samples stored in a memory. The elements and structure of the in-service phase noise measurement system and method of the present invention may equally be implemented using hardware circuitry. The elements of the system may implemented as discrete filters, logic circuits and delay lines. Alternatively, the elements may be implemented in one or more application specific integrated circuit (ASIC) device(s) or a combination or discrete circuit element and ASIC device(s).

A system and method for a in-service transmission system phase noise measurement has been described that measures such phase noise by way of comparing generated ideal signal samples to linear error-corrected received signal samples in order to measure the overall phase error. Linear distortion must be removed from the received actual signal samples and the linear error-corrected received signal samples are computed from the received actual signal samples without applying the transmission system's receiver filter. The ideal signal samples are then estimated and regenerated from the linear error-corrected received signal samples. No training sequence is required. A segmented dynamic slicer accurately estimates the ideal signal samples. From the measured overall phase error, phase error from nonlinear distortion is estimated by utilizing the systematic nature of the nonlinear error and the random nature of the phase noise by computing a weighted, least-square based polynomial regression on the phase error samples estimated from the comparison of the generated ideal signal samples and the linear error-corrected received signal samples. Based on the relationship of the additive noise-induced phase noise with signal magnitude, the variances of carrier phase noise and additive noise-induced phase noise in phase versus signal magnitude space are estimated from the linear and nonlinear error free phase error. The carrier phase noise is estimated by suppressing the additive noise induce phase noise by establishing a threshold based on derived phase noise variances and replacing the phase noise outside the threshold with random values having a distribution equivalent to the carrier phase noise. The carrier spectrum with phase jitter may be displayed as a power spectrum of the phase noise.

It will be obvious to those having skill in the art that many changes may be made to the details of the above-described embodiments of this invention without departing from the underlying principles thereof. Accordingly, the scope of the present invention should, therefore, be determined only by the following claims.

What is claimed is:

1. A method for performing an in-service phase noise measurement representing carrier phase jitter on a digitally modulated radio frequency signal wherein the digital modulation contains digital symbols and signal samples are generated representative of the received digitally modulated radio frequency signal comprising the steps of:
   a) correcting for linear distortions in the received signal samples using linear equalization;
   b) generating reference signal samples from estimated transmitted digital symbols of the digital modulation using the received signal samples;
   c) calculating magnitude values from the reference signal samples;
   d) time-aligning the received signal samples with the reference signal samples;
   e) generating phase error values using the reference signal samples and the received signal samples;
   f) removing largely deviated phase error values that exceed boundary values in phase error versus magnitude space;
   g) deriving coefficients of a phase nonlinear behavior function using the phase error values within the boundary values;
   h) estimating nonlinear phase error values as a function of the reference magnitude values using the derived coefficients in the nonlinear behavior function;
   i) removing the nonlinear phase error values from the phase error values for estimating phase noise values due to carrier phase jitter and additive noise; and
   j) suppressing additive noise induced phase noise from the carrier phase jitter.

2. The method for performing an in-service phase noise measurement as recited in claim 1 wherein the suppressing of additive noise induced phase noise step further comprises the steps of:
   a) establishing a relationship in phase-magnitude space for carrier phase jitter, additive noise and signal magnitude of the estimated phase noise values;
   b) estimating respective variances for carrier phase jitter and additive noise induced phase noise in phase-magnitude space;
   c) establishing a threshold based on the variances of the carrier phase jitter and the additive noise; and
   d) estimating phase noise values representative of carrier phase jitter by suppressing the phase noise values outside the threshold.

3. The method for performing an in-service phase noise measurement as recited in claim 1 further comprising the step of generating a power spectrum of the phase noise from the phase noise values representative of the carrier phase jitter.

4. The method for performing an in-service phase noise measurement as recited in claim 3 further comprising the step of displaying the power spectrum of the phase noise.

5. The method for performing an in-service phase noise measurement as recited in claim 1 wherein the generating reference signal samples step comprises the steps of:
   a) estimating decision levels of a multi-region dynamic slicer using the received signal samples;
   b) estimating the transmitted digital symbols from the received signal samples using the multi-region dynamic slicer; and
   c) regenerating the reference signal samples from the estimated symbols.

6. The method for performing an in-service phase noise measurement as recited in claim 1 wherein the removing largely deviated phase error values step comprises the steps of:
   a) dividing the phase error values into subranges along the reference magnitude dimension;
   b) estimating mean and variance statistics of the phase error values within each subrange;
   c) deriving boundary values based on the mean and variance of the phase error values for each subrange; and
   d) discarding the phase error values that lie outside the boundary values.

7. The method for performing an in-service phase noise measurement as recited in claim 1 wherein the removing largely deviated phase error values step comprises the steps of:
   a) dividing the phase error values into subranges along the reference magnitude dimension;
   b) estimating the histogram and probability density of the phase error values within each subrange;
   c) deriving boundary values based on the histogram and probability density of the phase error values for each subrange; and d) discarding the phase error values that lie outside the boundary values.

8. The method for performing an in-service phase noise measurement as recited in claim 1 wherein the coefficient deriving step further comprises the step of separating systematic phase error values from random phase error values by applying an optimal curve fitting on the phase error values.

9. The method for performing an in-service phase noise measurement as recited in claim 8 further comprising the step of applying a weighting function to the phase error values based on the probability distribution of the magnitude values of the transmitted digitally modulated signal samples.

10. A method for performing an in-service phase noise measurement representing carrier phase jitter on a digitally modulated radio frequency signal generated by a transmission system having a transmitter filter and a receiver filter wherein signal samples are generated representative of the digitally modulated radio frequency signal and filtered signal samples are generated by filtering the signal samples through a transmission system receiver filter, unfiltered signal samples are generated by bypassing the transmission system receiver filter, reference signal samples are generated from estimated transmitted digital symbols of the digital modulation that are time-aligned with the unfiltered signal samples, phase error values are generated from the time-aligned unfiltered and reference signal samples, magnitude values are calculated from the reference signal samples and nonlinear phase error values are derived from the phase error values comprising the steps of:
 a) correcting linear distortion phase errors using linear equalization;
 b) removing the nonlinear phase error values from the phase error values for estimating phase noise values due to carrier phase jitter and additive noise; and
 c) suppressing additive noise induced phase noise from the carrier phase jitter.

11. The method for performing an in-service phase noise measurement as recited in claim 10 wherein the suppressing of additive noise induced phase noise step further comprises the steps of:
 a) establishing a relationship in phase-magnitude space for carrier phase jitter, additive noise and signal magnitude of the estimated phase noise values;
 b) estimating respective variances for carrier phase jitter and additive noise induced phase noise in phase-magnitude space;
 c) establishing a threshold based on the variances of the carrier phase jitter and the additive noise; and
 d) estimating phase noise values representative of carrier phase jitter by suppressing the phase noise values outside the threshold.

12. The method for performing an in-service phase noise measurement as recited in claim 10 further comprising the step of generating a power spectrum of the phase noise from the phase noise values representative of the carrier phase jitter.

13. The method for performing an in-service phase noise measurement as recited in claim 12 further comprising the step of displaying the power spectrum of the phase noise.

14. A method for performing an in-service phase noise measurement representing carrier phase jitter on a digitally modulated radio frequency signal generated by a transmission system having a transmitter filter and a receiver filter where the digitally modulated radio frequency signal is down converted to an intermediate frequency signal and digitized to produce intermediate frequency signal samples comprising the steps of:
 a) demodulating the intermediate frequency signal samples to filtered baseband signal samples using a transmission system receiver filter for filtering signal samples wherein the filtered demodulation process produces estimated carrier offsets values, timing phase and rate offset parameters, gain factor, pilot level estimation value, and equalizer coefficients;
 b) down converting the intermediate frequency signal samples to baseband using the estimated carrier offset values;
 c) resampling the down converted signal samples using the estimated timing phase and rate parameters;
 d) applying the estimated gain factor to the resampled signal samples;
 e) equalizing the resampled signal samples by using the estimated equalizer coefficients for generating unfiltered signal samples;
 f) generating reference signal samples from estimated transmitted digital symbols of the digital modulation using either the filtered or unfiltered signal samples;
 g) calculating magnitude values from the reference signal samples;
 h) time-aligning the unfiltered signal samples with the reference signal samples;
 i) generating phase error values using the reference signal samples and the unfiltered signal samples;
 j) removing phase error values that exceed boundary values in phase error versus magnitude space;
 k) deriving coefficients of a phase nonlinear behavior function using the phase error values within the boundary values; and
 l) estimating nonlinear phase error values as a function of the reference magnitude values using the derived coefficients in the nonlinear behavior function.
 m) removing the nonlinear phase error values from the phase error values for estimating phase noise values containing carrier phase jitter and additive noise;
 n) establishing a relationship in phase-magnitude space for carrier phase jitter, additive noise and signal magnitude of the estimated phase noise values;
 o) estimating respective variances for carrier phase jitter and additive noise induced phase noise in phase-magnitude space; and
 p) establishing a threshold based on the variances of the carrier phase jitter and the additive noise;
 q) estimating phase noise values representative of carrier phase jitter by suppressing the phase noise values outside the threshold; and
 r) generating a power spectrum of the phase noise from the phase noise values representative of the carrier phase jitter.

15. An apparatus for performing an in-service phase noise measurement representing carrier phase jitter on a digitally modulated radio frequency signal wherein the digital modulation contains digital symbols and the apparatus generates signal samples representative of the received digitally modulated radio frequency signal comprising:
 means for correcting linear distortions in the received signal samples using linear equalization;
 means for generating reference signal samples from estimated transmitted digital symbols in the modulation data using the received signal samples;

means for calculating magnitude values from the reference signal samples;

means for time-aligning the received signal samples with the reference signal samples;

means for generating phase error values using the reference signal samples and the received signal samples;

means for removing largely deviated phase error values that exceed boundary values in error versus magnitude space;

means for deriving coefficients of a phase nonlinear behavior function using the phase error values within the boundary values;

means for estimating nonlinear phase error values as a function of the reference magnitude values using the derived coefficients in the nonlinear behavior function;

a nonlinear phase error remover receiving the phase error values and the nonlinear phase error values and estimating phase noise values containing carrier phase jitter and additive noise by removing the nonlinear phase error values from the phase error values; and means for suppressing additive noise induced phase to estimate the carrier phase jitter.

16. The apparatus for performing an in-service phase noise measurement as recited in claim 15 further comprising:

means for establishing a relationship in phase-magnitude space for carrier phase jitter, additive noise and signal magnitude of the estimated phase noise values;

a phase noise variance estimator receiving the estimated phase noise values and the estimated magnitude values and estimating respective variances for carrier phase jitter and additive noise induced phase noise in phase-magnitude space; and an additive noise suppressor receiving the estimated phase noise values, the variances for the carrier phase jitter and the additive noise, and the estimated magnitude values and estimating phase noise values representative of carrier phase jitter by establishing a threshold based on the variances of the carrier phase jitter and the additive noise and suppressing the phase noise values outside the threshold.

17. The apparatus for performing an in-service phase noise measurement as recited in claim 15 further comprising a carrier spectrum analyzer receiving the estimated phase noise values representative of the carrier phase jitter and generating a power spectrum of the estimated phase noise values.

18. The apparatus for performing an in-service phase noise measurement as recited in claim 17 further comprising means for displaying the power spectrum of the estimated phase noise values.

19. The apparatus for performing an in-service phase noise measurement as recited in claim 15 wherein the means for generating reference signal samples comprises:

means for estimating decision levels of a multi-region dynamic slicer using the received signal samples;

means for estimating the transmitted digital symbols from the received signal samples using the multi-region dynamic slicer; and means for regenerating the reference signal samples from the estimated symbols.

20. The apparatus for performing an in-service phase noise measurement as recited in claim 15 wherein the means for removing largely deviated nonlinear phase error values comprises:

means for dividing the phase error values into subranges along the reference magnitude dimension;

means for estimating mean and variance statistics of the phase error values within each subrange;

means for deriving boundary values based on the mean and variance of the phase error values for each subrange; and means for discarding the phase error values that lie outside the boundary values.

21. The apparatus for performing an in-service phase noise measurement as recited in claim 15 wherein the means for removing largely deviated phase error values comprises:

means for dividing the phase error values into subranges along the reference magnitude dimension;

means for estimating the histogram and probability density of the phase error values within each subrange;

means for deriving boundary values based on the histogram and probability density of the phase error values for each subrange; and means for discarding the phase error values that lie outside the boundary values.

22. The apparatus for performing an in-service phase noise measurement as recited in claim 15 wherein the means for deriving coefficients further comprises means for separating systematic phase error values from random phase error values by applying an optimal curve fitting on the phase error values.

23. The apparatus for performing an in-service phase noise measurement as recited in claim 22 further comprising applying a weighting function to the phase error values based on the probability distribution of the magnitude values of the transmitted digitally modulated signal samples.

24. An apparatus for performing an in-service phase noise measurement representing carrier phase jitter on a digitally modulated radio frequency signal generated by a transmission system having a transmitter filter and a receiver filter comprising:

a receiver generating intermediate frequency signal samples representative of the digitally modulated radio frequency signal with the signal samples containing linear and nonlinear magnitude errors, carrier phase jitter, additive noise and other distortions;

a demodulator generating filtered signal samples time-aligned carrier-recovered linear error-corrected signal samples containing nonlinear phase errors;

a reference signal sample generator producing reference signal samples from estimated transmitted digital symbols of the digital modulation that are time-aligned with the unfiltered signal samples;

a magnitude computer receiving the reference signal samples for estimating reference magnitude values;

a phase error detector receiving the filtered and unfiltered signal samples and generating phase error values containing nonlinear phase error, carrier phase jitter and additive noise;

a nonlinear phase error estimator receiving the phase error values and the reference magnitude values and generating nonlinear phase error values by removing phase error values that exceed boundary values in phase error versus magnitude space, deriving coefficients of a phase nonlinear behavior function using the phase error values within the boundary values, and estimating nonlinear phase error values as a function of the reference magnitude values using the derived coefficients in the nonlinear behavior function;

a nonlinear phase error remover receiving the phase error values and the nonlinear phase error values and estimating phase noise values containing carrier phase jitter and additive noise by removing the nonlinear phase error values from the phase error values;

a phase noise variance estimator receiving the estimated phase noise values and the ideal magnitude values and estimating respective variances for carrier phase jitter and additive noise induced phase noise in phase-magnitude space;

an additive noise suppressor receiving the estimated phase noise values, the variances for the carrier phase jitter and the additive noise, and the ideal magnitude values and estimating phase noise values representative of carrier phase jitter by establishing a threshold based on the variances of the carrier phase jitter and the additive noise and suppressing the phase noise values outside the threshold; and a carrier spectrum analyzer receiving the estimated phase noise values representative of the carrier phase jitter and generating a power spectrum of the estimated phase noise values.

* * * * *